United States Patent
O'Sullivan et al.

(10) Patent No.: US 9,442,916 B2
(45) Date of Patent: *Sep. 13, 2016

(54) MANAGEMENT OF LANGUAGE USAGE TO FACILITATE EFFECTIVE COMMUNICATION

(75) Inventors: Patrick J. O'Sullivan, Dublin (IE); Fred Raguillat, Meath (IE); Edith H. Stern, Yorktown Heights, NY (US); Barry E. Willner, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/481,699

(22) Filed: May 25, 2012

(65) Prior Publication Data
US 2013/0304455 A1    Nov. 14, 2013

Related U.S. Application Data

(63) Continuation of application No. 13/471,358, filed on May 14, 2012.

(51) Int. Cl.
| | | |
|---|---|---|
| *G06F 17/27* | (2006.01) | |
| *G06F 17/24* | (2006.01) | |
| *H04L 12/58* | (2006.01) | |

(52) U.S. Cl.
CPC ......... *G06F 17/2785* (2013.01); *G06F 17/241* (2013.01); *H04L 51/063* (2013.01)

(58) Field of Classification Search
CPC .. G06F 17/28; G06F 17/2854; G06F 17/289; G06F 17/275; G06F 17/2836; G06F 17/30864; G06F 17/3053; G10L 15/18; G10L 51/32

USPC ........................................................ 704/1–10
See application file for complete search history.

(56) References Cited

U.S. PATENT DOCUMENTS

| | | |
|---|---|---|
| 4,862,408 A | 8/1989 | Zamora |
| 5,503,561 A | 4/1996 | Cohen |

(Continued)

FOREIGN PATENT DOCUMENTS

| | | |
|---|---|---|
| JP | 07175813 | 7/1995 |
| JP | 2010056682 | 3/2010 |

OTHER PUBLICATIONS

Mell, P. and T. Grance, "Effectively and Securely Using the Cloud Computing Paradigm", NIST, Information Technology Laboratory, Oct. 7, 2009, 80 pp.

(Continued)

*Primary Examiner* — Michael Ortiz Sanchez
(74) *Attorney, Agent, or Firm* — Janaki K. Davda; Konrad, Raynes, Davda and Victor LLP

(57) ABSTRACT

Provided are techniques for providing annotations for revising a message. A message to be sent from a sender to a recipient is received. A meaning map associated with the sender and a meaning map associated with the recipient are obtained. The message is parsed into sub-constructs. The sub-constructs are compared in the meaning map associated with the sender and the meaning map associated with the recipient. Alternative language for the sub-constructs is identified. Annotations are provided based on the alternative language.

21 Claims, 8 Drawing Sheets

(56) References Cited

U.S. PATENT DOCUMENTS

| | | | |
|---|---|---|---|
| 5,701,497 A | | 12/1997 | Yamauchi et al. |
| 5,796,948 A | | 8/1998 | Cohen |
| 6,421,655 B1 | * | 7/2002 | Horvitz et al. ............... 706/61 |
| 6,470,306 B1 | * | 10/2002 | Pringle et al. ................. 704/3 |
| 7,013,264 B2 | | 3/2006 | Dolan et al. |
| 8,442,940 B1 | | 5/2013 | Faletti et al. |
| 2002/0004819 A1 | | 1/2002 | Agassy et al. |
| 2002/0188670 A1 | | 12/2002 | Stringham |
| 2004/0225640 A1 | | 11/2004 | Brown et al. |
| 2005/0038662 A1 | * | 2/2005 | Sarich ............... G06F 17/289 704/277 |
| 2005/0065777 A1 | * | 3/2005 | Dolan et al. ................. 704/10 |
| 2006/0078864 A1 | * | 4/2006 | Jorgensen et al. ........ 434/323 |
| 2006/0167992 A1 | * | 7/2006 | Cheung ............. G06F 17/241 709/204 |
| 2006/0217956 A1 | * | 9/2006 | Nagao et al. ................. 704/2 |
| 2007/0016401 A1 | * | 1/2007 | Ehsani et al. ................ 704/9 |
| 2007/0208569 A1 | * | 9/2007 | Subramanian et al. ..... 704/270 |
| 2008/0126074 A1 | | 5/2008 | Whitelock et al. |
| 2009/0112583 A1 | | 4/2009 | Sakao et al. |
| 2009/0119095 A1 | * | 5/2009 | Beggelman et al. ........... 704/9 |
| 2009/0192783 A1 | * | 7/2009 | Jurach et al. ................. 704/4 |
| 2010/0145694 A1 | * | 6/2010 | Ju et al. ..................... 704/235 |
| 2010/0268682 A1 | | 10/2010 | Lewis et al. |
| 2010/0274552 A1 | | 10/2010 | Gao et al. |
| 2011/0135278 A1 | | 6/2011 | Klappert et al. |
| 2011/0161279 A1 | | 6/2011 | Rao et al. |
| 2011/0208816 A1 | * | 8/2011 | Chavez ....................... 709/206 |
| 2011/0208822 A1 | * | 8/2011 | Rathod ....................... 709/206 |
| 2011/0213742 A1 | | 9/2011 | Lemmond et al. |
| 2011/0264439 A1 | * | 10/2011 | Sata et al. ..................... 704/4 |
| 2011/0282645 A1 | * | 11/2011 | Khuda ........................... 704/3 |
| 2011/0295595 A1 | | 12/2011 | Cao et al. |
| 2012/0150530 A1 | * | 6/2012 | Iida et al. ..................... 704/2 |
| 2013/0013991 A1 | * | 1/2013 | Evans .......................... 715/206 |
| 2013/0030789 A1 | * | 1/2013 | Dalce ........................... 704/2 |
| 2013/0151235 A1 | | 6/2013 | Och et al. |
| 2013/0246045 A1 | | 9/2013 | Ulanov et al. |
| 2013/0304738 A1 | | 11/2013 | Johnson et al. |

OTHER PUBLICATIONS

Mell, P. and T. Grance, "The NIST Definition of Cloud Computing (Draft)", Recommendations of the National Institute of Standards and Technology, Special Publication 800-145 (Draft), Jan. 2011, 7 pp.

Saluja, A., I. Lane, and Y. Zhang, "Context-Aware Language Modeling for Conversational Speech Translation", [online], [Retrieved on May 14, 2012], retrieved from the Internet at <URL: http://mlt.sv.cmu.edu/joy/publications/mtsummitxiii-contextaware.pdf>, 8 pp.

SAS Institute Inc., "SAS Sentiment Analysis", [online], [retrieved on May 14, 2012], retrieved from the Internet at <URL: http://www.sas.com/text-analytics/sentiment-analysis/#section=1>, 4 pp.

U.S. Appl. No. 13/471,358, entitled "Management of Language Usage to Facilitate Effective Communication", invented by P.J. O'Sullivan, filed May 14, 2012, 36 pp. [54.83 (Appln)].

Preliminary Remarks for U.S. Appl. No. 13/471,358, filed May 14, 2012, 1 pp. [54.83 (PrelimAmend)].

R. Goyal, "Elements of the Communication Process", dated Nov. 11, 2012, (online), retrieved from the internet on Apr. 10, 2013, at URL>www.http://superraceworld.com/?p=354, Total pp. 5.

D. Cleland et al.,"Engineering Team Management", Library of Congress Cataloging-in-Production Data, dated 1986, published by Van Nostrand Reinhold Company Inc., New York, New York, Total pp. 3.

International Search Report, dated Sep. 7, 2013, for International Application No. PCT/IB2013/053069, filed Apr. 18, 2013, total 7 pages.

Machine Translation of JP2010056682, filed Mar. 11, 2010, Total 107 pages.

Office Action, dated Oct. 8, 2013, for U.S. Appl. No. 13/471,358 (54.83) filed May 14, 2012. entitled, "Management of Language Usage to Facilitate Effective Communication", invented by Patrick J. Osullivan et al., pp. 1-30.

Response to Office Action, dated Jan. 8, 2014, for U.S. Appl. No. 13/471,358 (54.83) filed May 14, 2012. entitled, "Management of Language Usage to Facilitate Effective Communication", invented by Patrick J. Osullivan et al., pp. 1-11.

Final Office Action, dated Apr. 11, 2014, for U.S. Appl. No. 13/471,358 (54.83) filed May 14, 2012. entitled, "Management of Language Usage to Facilitate Effective Communication", invented by Patrick J. Osullivan et al., Total 30 pages.

Response to Final Office Action, dated Jul. 9, 2014, for U.S. Appl. No. 13/471,358 (54.83) filed May 14, 2012. entitled, "Management of Language Usage to Facilitate Effective Communication", invented by Patrick J. Osullivan et al., Total 9 pages.

Office Action, dated Sep. 25, 2014, for U.S. Appl. No. 13/471,358 (54.83), filed May 14, 2012, invented by Patrick J. Osullivan et al., Total 27 pages.

Response to Office Action, dated Nov. 21, 2014, for U.S. Appl. No. 13/471,358 (54.83), filed May 14, 2012, invented by Patrick J. Osullivan et al., Total 11 pages.

Final Office Action, dated May 5, 2015, for U.S. Appl. No. 13/471,358 (54.83), filed May 14, 2012, invented by Patrick J. Osullivan et al., Total 25 pages.

Response to Final Office Action, dated Jun. 5, 2015, for U.S. Appl. No. 13/471,358 (54.83), filed May 14, 2012, invented by Patrick J. Osullivan et al., Total 11 pages.

European Search Report, dated Jul. 15, 2015, for Application No. EP13790168.2, Total 8 pages.

Office Action, dated Jul. 8, 2015, for U.S. Appl. No. 13/471,358 (54.83), filed May 14, 2012, invented by Patrick J. Osullivan et al., Total 15 pages.

Response to Office Action, dated Oct. 8, 2015, for U.S. Appl. No. 13/471,358 (54.83), filed May 14, 2012, invented by Patrick J. Osullivan et al., Total 7 pages.

European Search Report, dated Jul. 15, 2015, for Application No: EP13790168.2, Total 8 pages.

Response with Amended Specification and Amended Claims, dated Jan. 20, 2016, for Application No. EP13790168.2, Total 11 pages.

Patent 5701497 is the English counterpart for JPH07175813, Jul. 14, 1995.

Notice of Allowance, dated Oct. 27, 2015, for U.S. Appl. No. 13/471,358 (54.83), filed May 14, 2012, invented by Patrick J. Osullivan et al., Total 13 pages.

Notice of Allowance, dated Jun. 20, 2016, for U.S. Appl. No. 13/471,358 (54.83), filed May 14, 2012, invented by Patrick J. Osullivan et al., Total 21 pages.

* cited by examiner

MANAGEMENT OF LANGUAGE USAGE TO FACILITATE EFFECTIVE COMMUNICATION

CROSS-REFERENCE TO RELATED APPLICATIONS

This application is a continuation of and claims the benefit of U.S. patent application Ser. No. 13/471,358, filed May 14, 2012, which application is incorporated herein by reference in its entirety.

FIELD

Embodiments of the invention relate to management of language usage to facilitate effective communication.

BACKGROUND

Effective communication of all sorts, including informal (e.g., interpersonal) and formal (e.g., official business), is needed every day. Effective communication has the following characteristics: mutual understanding of content by all interlocutors, which may be evidenced by feedback; people getting what they need to know when they need to know it; and written records that are easily accessible by subject and chronology. Effective communication is often difficult.

There are a number of barriers to effective communication, such as:
  Difference in technical or academic discipline
  Prejudices and attitudes
  Personality differences
  Hidden Agendas
  Emotions
  Fear of blame or retribution
  Culture differences
  No communication plan
  Imprecise language
  People use language differently Another aspect of communication is that people are now communicating more with people they do not know well or have not met in person. When people interact and talk together for a long time (especially in person), they understand better how each other uses language.

In a simple example, a first person might say "the software is buggy", and the first person may mean that one bug was found. A second person might say "the software is buggy", and the second person may mean that the software crashes, produces logical errors, and needs to be retested and rewritten. If the people have worked together on software for a long time and one person says "the software is buggy", the other person may know what the person means.

Because each person is an individual with a unique conditioning, personality, etc., it is possible for there to occur miscommunications or misinterpretations, particularly when dealing with complex and/or controversial topics across multiple people with different cultural and ethnic backgrounds.

People see the world and use language differently. What person A says and what person B hears may be two different things. This is based on the fact that their minds work differently, they have different education, they have different cultural exposure, and they speak and live with different people.

Communication, which is useful to resolving most conflicts, may be the cause of conflict. For instance, a sender may not be clear in his or her communication or a recipient may not be truly listening. Making assumptions can also affect communication. A lack of communication can result in misunderstanding.

With communication, both the sender and recipient of a message should understand the message in the way the sender means for the message to be understood. When there is effective communication, the recipient reads and then expresses an understanding of the message in his/her own words back to the sender. The sender determines whether the message was understood as intended and, if not, sends further communications until satisfied. While this can be time consuming and sometimes frustrating, it is useful to proceed with work at hand. Without a mutual understanding, people may take action with the wrong idea of what to do and how to do it. Inevitably, that leads to rework. It can also lead to interpersonal conflict, which can be far more costly and disruptive than rework.

SUMMARY

Provided are a method, computer program product, and system for providing annotations for revising a message. A message to be sent from a sender to a recipient is received. A meaning map associated with the sender and a meaning map associated with the recipient are obtained. The message is parsed into sub-constructs. The sub-constructs are compared in the meaning map associated with the sender and the meaning map associated with the recipient. Alternative language for the sub-constructs is identified. Annotations are provided based on the alternative language.

BRIEF DESCRIPTION OF THE SEVERAL VIEWS OF THE DRAWINGS

Referring now to the drawings in which like reference numbers represent corresponding parts throughout:

FIG. 5 is formed by FIG. 5A and FIG. 5B.

DETAILED DESCRIPTION

Figure 1:
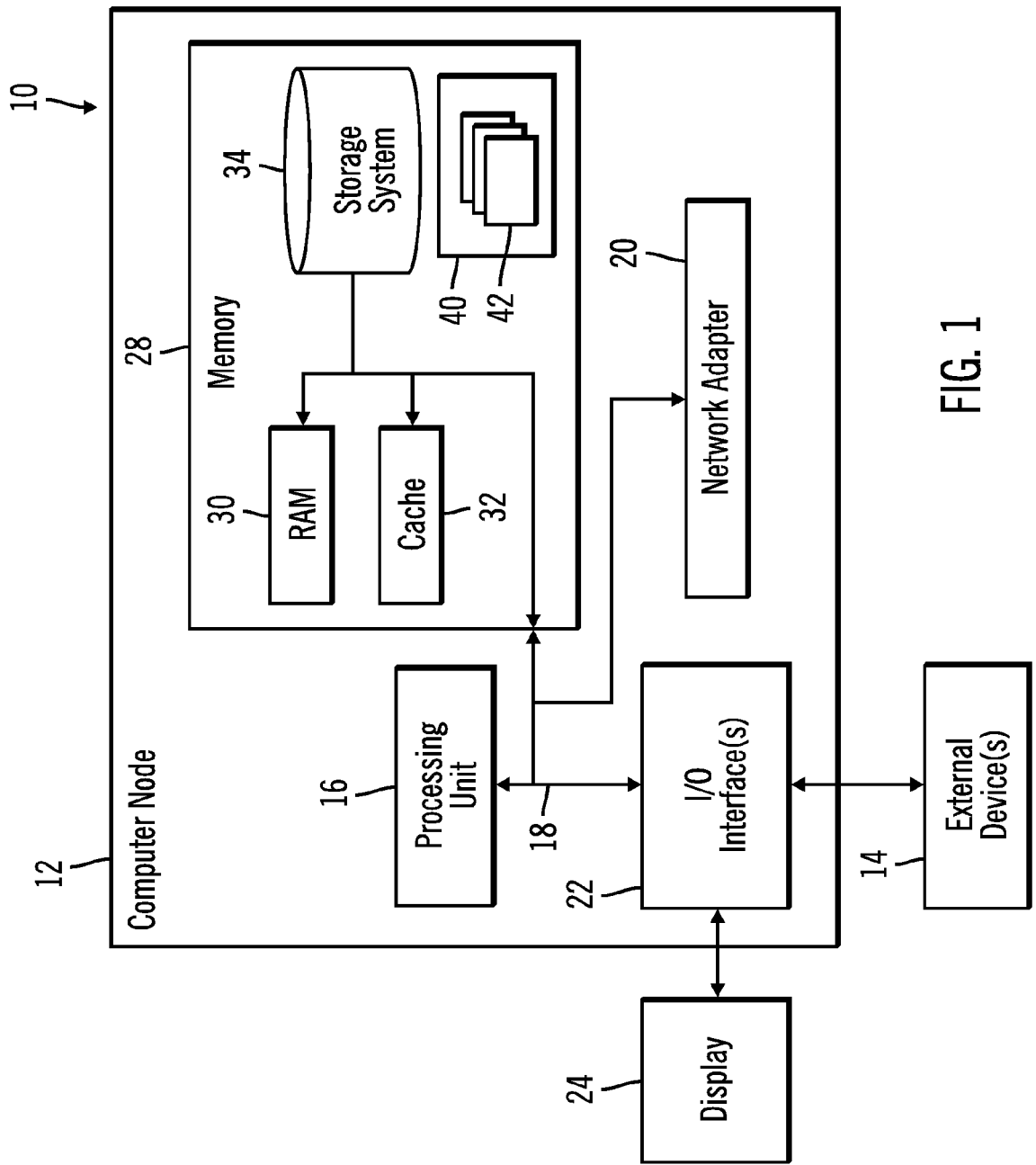
FIG. 1 depicts a cloud computing node in accordance with certain embodiments.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
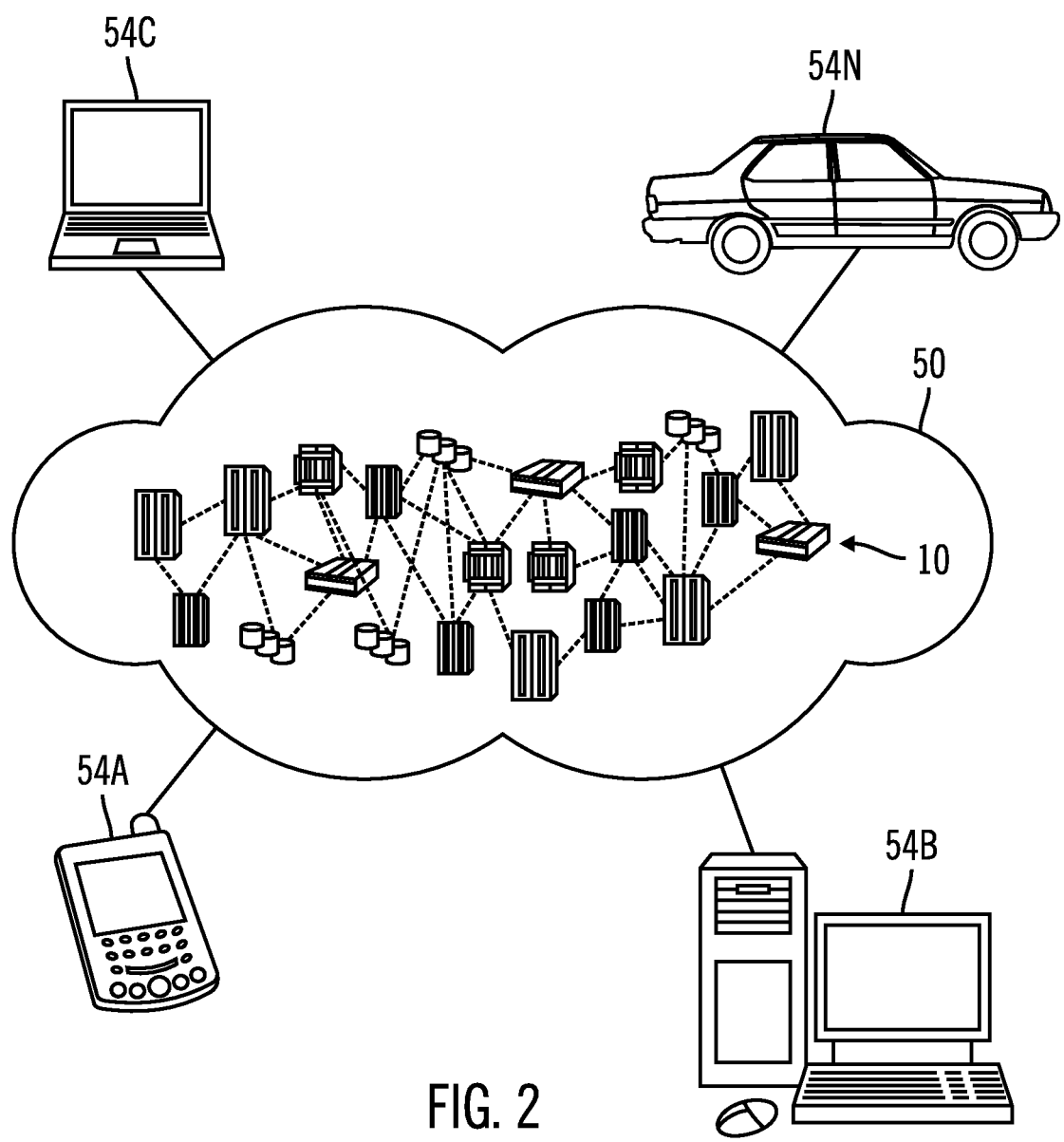
FIG. 2 depicts a cloud computing environment in accordance with certain embodiments.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
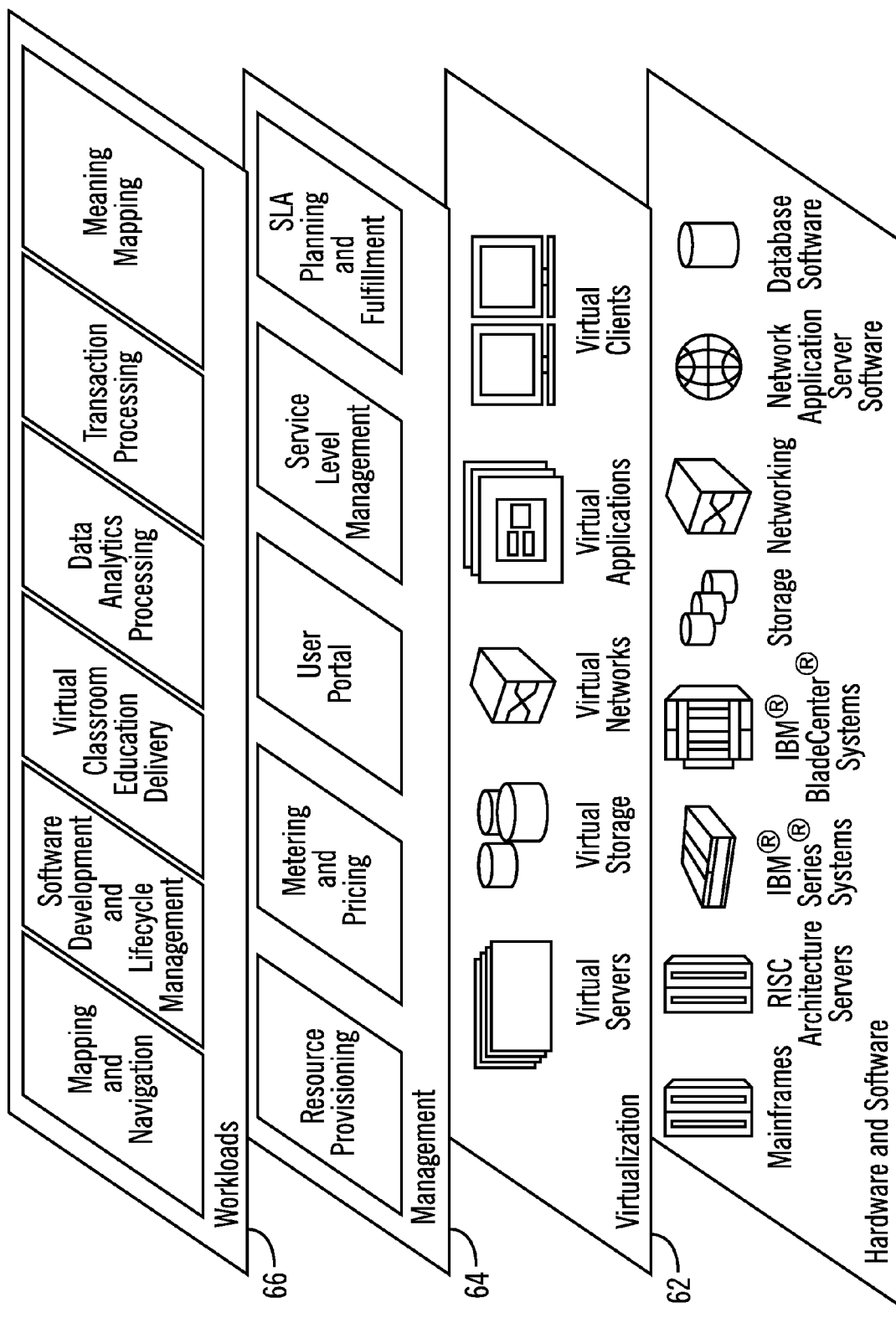
FIG. 3 depicts abstraction model layers in accordance with certain embodiments.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2®, database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and meaning mapping.

Thus, in certain embodiments, software, implementing meaning mapping in accordance with embodiments described herein, is provided as a service in a cloud environment.

Figure 4:
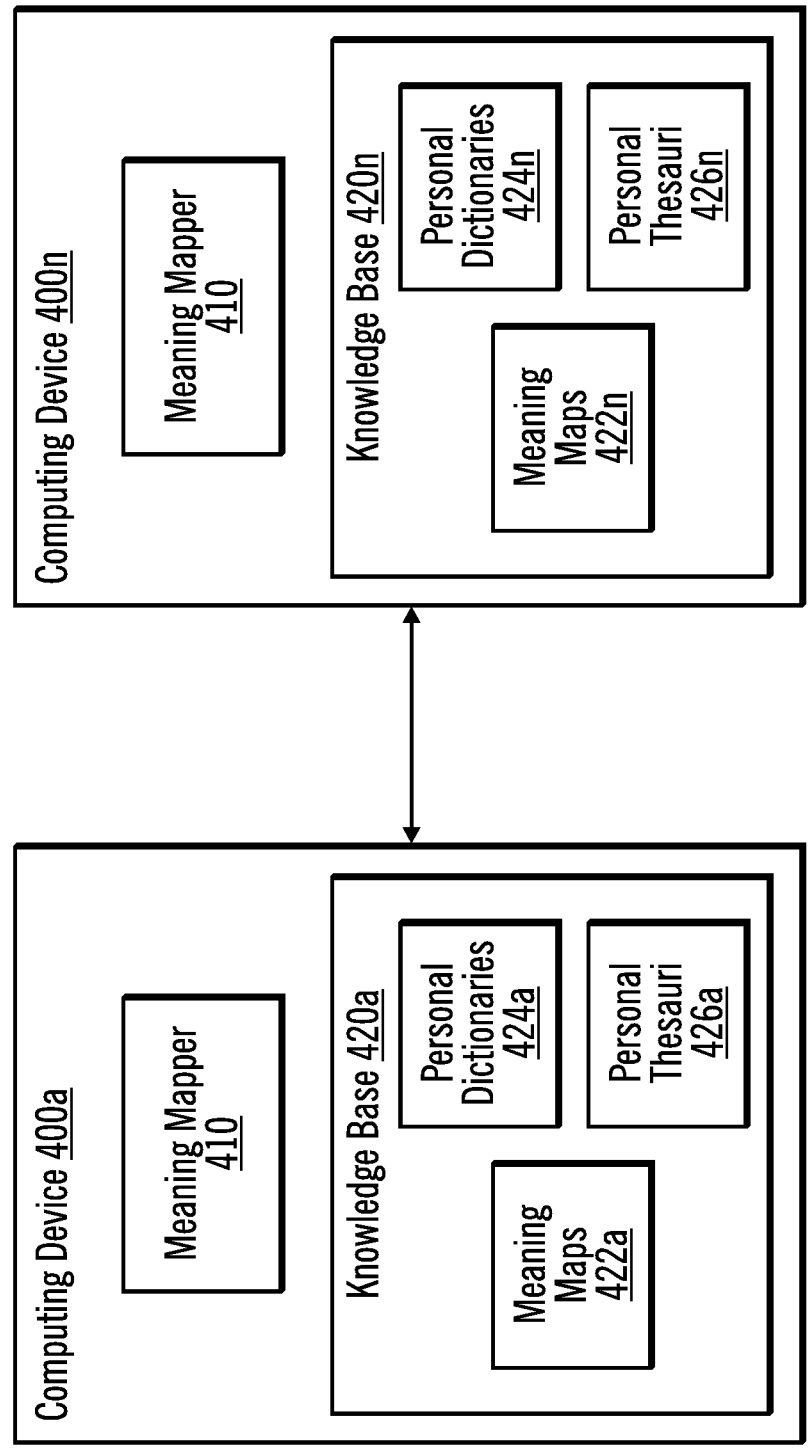
FIG. 4 illustrates a computing environment in accordance with certain embodiments.

FIG. 4 illustrates a computing environment in accordance with certain embodiments. The computing environment includes one or more computing devices 400a . . . 400n. The computing devices 400a . . . 400n may be coupled together via a cloud or other communication network. Each computing device 400a . . . 400n includes a meaning mapper 410. Also, each computing device 400a . . . 400n includes a knowledge base 420a . . . 420n. Each knowledge base 420a . . . 420n includes meaning maps 422a . . . 422n, personal dictionaries 424a . . . 424n, and personal thesauri 426a . . . 426n. The knowledge bases 420a . . . 420n may be the same or different knowledge bases (e.g., may have some of the same meaning maps 422a . . . 422n and some different meaning maps 422a . . . 422n).

In certain embodiments, two users at a single computing device 400a . . . 400n may use the meaning mapper 410 to assist in their communications with each other. In other environments, users sitting at different computing devices 400a . . . 400n may use the meaning mapper 410 to assist in their communications with each other.

The meaning mapper 410 facilitates effective communication recognizing the people use language differently. In particular, the meaning mapper 410 determines an approximation of the intended meaning of the message using a first meaning map 422a . . . 422n associated with the sender and a second meaning map 422a . . . 422n associated with a recipient. The meaning mapper 410 compares sub-constructs (e.g., tokens, words, phrases, etc.) in the first meaning map 422a . . . 422n with sub-constructs in the second meaning map 422a . . . 422n and returns the message to the sender if the comparisons show a difference greater than a threshold with an indication of how different parts of the message effected the comparison.

In certain embodiments, the meaning mapper 410 allows electronic messages to be translated per a meaning map 422a . . . 422n that is associated with a user (e.g., as a user profile) and is associated with a modality. In certain embodiments, a modality is a dialect defined through text analytics. In certain embodiments, one meaning map 422a . . . 422n may include mappings for different dialects. In certain alternative embodiments, a user who spoke different dialects may have multiple meaning maps 422a . . . 422n, one for each dialect. Thus, the meaning mapper 410 enables a sender of a message to be alerted how the message being sent may be read/interpreted by a recipient prior to the message being sent. Thus, the meaning mapper 410 offers the sender the opportunity to correct potential misinterpretation for a specific recipient. Also, the meaning mapper 410 enables a recipient to receive annotations on how the message that has been received should be interpreted.

Each knowledge base 420a . . . 420n may be described as a corpus that stores language pair corrections which, in the act of communication, are leveraged and provided to a user in a User Interface (UI) I to hint or suggest at potential variable interpretation(s) and to hint or suggest what is actually meant. Over time, each knowledge base 420a . . . 420n grows, and each knowledge base 420a . . . 420n guides knowledge of recorded misinterpretations that have been built up (e.g., by experts).

In certain embodiments, a group of people (e.g., all people using the meaning mapper 410 or some subset of people) answer a set of questions (e.g., multiple choice questions) to define a meaning map 422a . . . 422n. The questions are formulated to bring out different language usage by different users. In various embodiments, each meaning map 422a . . . 422n is constructed by machine and/or by human analysis of the answers.

For machine construction, the meaning map 422a . . . 422n may be constructed from reading existing writing, from hearing speech, or other means where what a user means when he/she says something can be inferred.

The meaning map 422a . . . 422n may be published (e.g., in the cloud environment) or in other ways made available to other users who wish to communicate with the user who is associated with the meaning map 422 . . . 422n.

For example, user A has an associated meaning map 422a . . . 422n that is used to interpret what/how user A would understand a message, and user B has an associated meaning map 422a . . . 422n that is used to interpret what/how user B would understand a message. When user A and user B communicate (e.g., user A sends user B an electronic message), the meaning mapper 410 determines whether there is a chance at misunderstanding and highlights words that may be misunderstood/misinterpreted by user B using the meaning maps 422a . . . 422n associated with user A and user B. Also, when user B receives the message, the meaning mapper 410 provides annotations on how user A intended the message to be understood using the meaning maps 422a . . . 422n associated with user A and user B. Annotations may be described as providing the meaning (e.g., interpretation) of the message for a particular recipient.

In certain embodiments, a personal dictionary 424a . . . 424n or personal thesaurus 426a . . . 426n is constructed so that the sender can better communicate to the recipient. A personal dictionary 424a . . . 424n may be described as a listing of words, with each of words having one or more definitions and zero or more pronunciations. In certain embodiments, the personal dictionary 424a . . . 424n may be described as interactive in that a user may alter the dictionary (e.g., add words or add definitions). In certain embodiments, each user may have a different personal dictionary 424a . . . 424n or groups of users may share personal dictionary 424a . . . 424n. A personal thesaurus 426a . . . 426n may be described as a listing of words, with each of the words have one or more synonyms and zero or more anonyms. In certain embodiments, the personal thesaurus 426a . . . 426n may be described as interactive in that a user may alter the thesaurus (e.g., add words or add synonyms). In certain embodiments, each user may have a different personal thesaurus 426a . . . 426n or groups of users may share personal thesaurus 426a . . . 426n. For example, if a word is identified (e.g., highlighted) as one that different users use differently, the meaning mapper 410 provides the sender with a list of words that mean the same thing to the user sending the message and any user receiving the message.

For example, if a sender says "I am arriving on the 8:15 train", then a recipient may not know whether the sender meant to be on the train that left the train station at 8:15 or the train that is arriving at 8:15. The meaning mapper 410 may use meaning maps 422a . . . 422n associated with the sender and the recipient to provide the sender with information on how the recipient may interpret the message. The meaning mapper 410 may also use meaning maps 422a . . . 422n associated with the sender and the recipient to provide the recipient with information on how the sender meant the message to be interpreted. In certain embodiments, other information may be used to help eliminate ambiguity. For example, if the meaning mapper 410 knows that there is no train arriving at 8:15 (e.g., based on a stored train schedule), the meaning mapper 410 can provide this information to the recipient or indicate that the sender meant to be on the train that left the train station at 8:15.

In certain embodiments, a level of misunderstanding or misinterpretation that is acceptable may be set by the receiver, by the sender, based on rules/policies, or other means. The level may be based on rules that everyone uses, may be a choice between rule sets, or may be customized on a per user basis. Then, the meaning mapper 410 evaluates the "level" of misunderstanding/misinterpretation. Using this level, a sender or recipient who is at a certain threshold is informed on potential misunderstandings when the threshold exceeds the level. In certain embodiments, the threshold is set by the receiver, by the sender, based on rules/policies, or other means.

In certain embodiments, a sender sends a message to multiple recipients. The meaning mapper 410 evaluates potential misunderstanding on a per recipient basis. The sender might set different thresholds for different recipients or alter the message for different recipients. In certain embodiments, some of the recipients are not screened (i.e., are not evaluated). These recipients have threshold=maximum (or infinity).

In certain embodiments, the meaning map 422a . . . 422n is developed based on responses from members of a sub-culture, geographic location, or other subgroup, and the responses are used to inform communications with members of that subgroup. If communications take place between a sender and a recipient who is not in that subgroup, the meaning mapper 410 may provide the sender with an approximation of the meaning map 422a . . . 422n that is appropriate for that communication. This allows identification of words or idioms that may not be understood by the recipient (e.g., to provide clarity across age cohorts and cultures).

For instance, if a baby boomer writes in a posting "I decided to deep six some of the records", the meaning map 422a . . . 422n may provide feedback indicating that recipients may not understand the intended meaning of "deep six" as "discard". Similarly, if a resident of Ireland posts, "we started the project in anger", the meaning map 422a . . . 422n may indicate that US readers will interpret this as "we were angry with (someone) when we started the project".

In certain embodiments, the meaning map 422a . . . 422n is centrally located and may be consulted by the sender before any communication is sent. In other embodiments, the recipient has access to the meaning map 422a . . . 422n, and may consult the potential meanings intended by the sender. If potential meanings contain ambiguities, the recipient can then request clarification of the sender.

Merely to enhance understanding, additional examples are provided herein.

Cross-cultural miscommunication may occur between a user from a first culture and a user from a second culture when the user from the second culture does not receive the sender's intended message. The greater the differences between the sender's and the recipient's cultures, the greater the chance for cross-cultural miscommunication. For example, a Japanese businessman wants to tell his Norwegian client that he is uninterested in a particular sale. To be polite, the Japanese businessman says, "That will be very difficult." The Norwegian client interprets the statement to mean that there are still unresolved problems, not that the deal is off. The Norwegian client responds by asking how his company can help solve the problems. The Japanese businessman, believing he has sent the message that there will be no sale, is mystified by the response.

As another example, a British boss asks a new, young American employee if he would like to have an early lunch at 1 P.M. each day. The American employee answers, "Yeah, that would be great!". The British boss, hearing the word yeah instead of the word yes, assumed that the employee is being rude, ill-mannered, and disrespectful. The British boss responds with a curt, "With that kind of attitude, you may as well forget about lunch!". The American employee is bewildered. Unfortunately, as is the case in most miscommunication, neither the sender nor the recipient is fully aware of what had gone wrong and why.

As a further example, the sentence 'You shouldn't steal library books'; with different emphasis placed on each word within an email will change the meaning and interpretation of the sentence, as in the following two sentences:

You shouldn't steal library books (implying that it may be acceptable for others to do so).

You shouldn't steal library books (implying that something like defacing them might be acceptable).

As yet another example of semantics used in sentences (i.e., it is in the context of a sentence that a given word takes on a definite meaning), the same word may have many distinct meanings:

He is a green lawyer. (i.e. inexperienced).

She is looking green. (i.e. nauseated).

We had a green winter last year. (i.e. no snow).

Figure 5A:
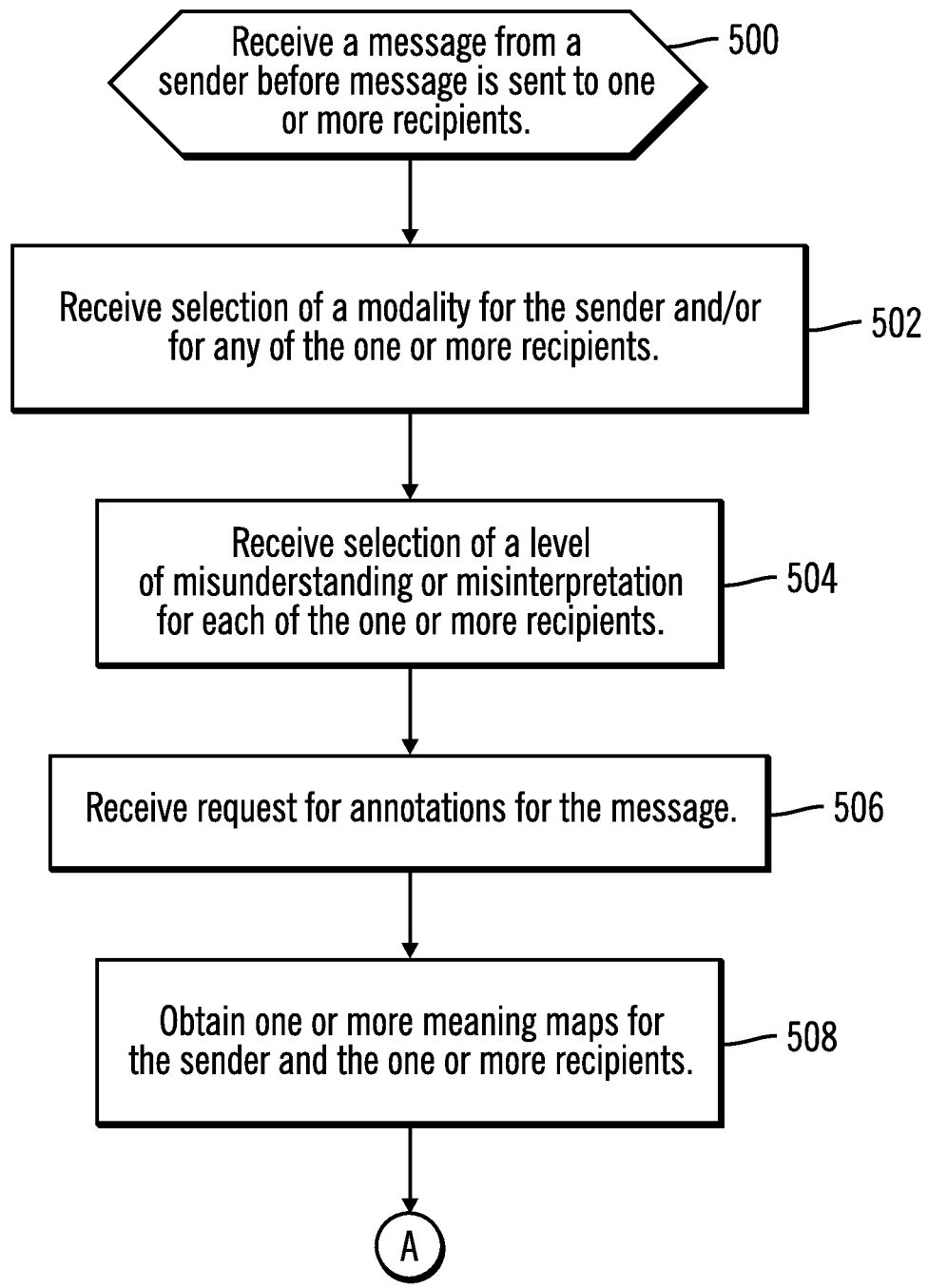
FIG. 5 illustrates, in a flow diagram, operations performed when a message is to be sent from a sender to one or more recipients in accordance with certain embodiments.
Figure 5B:
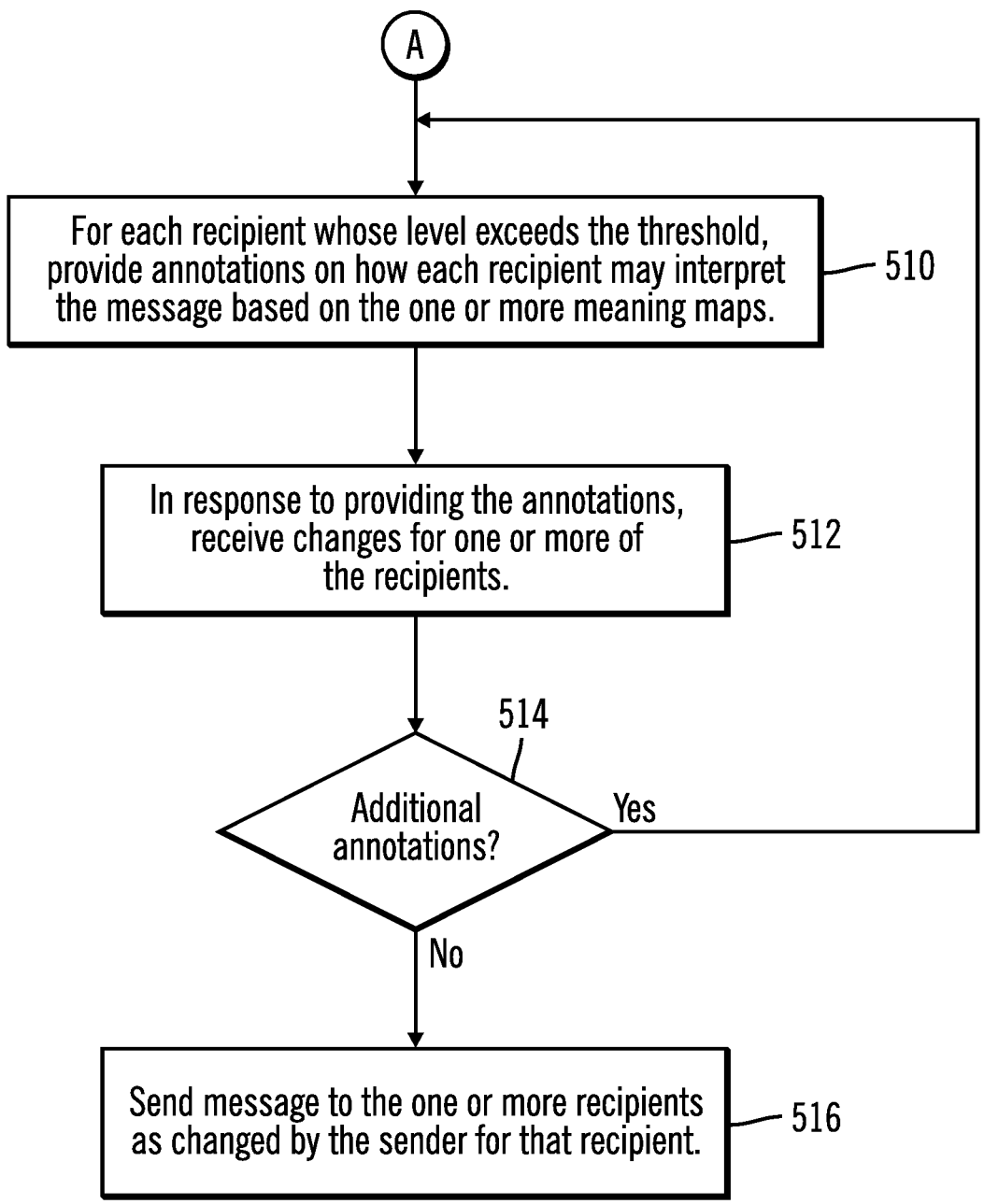

FIG. 5 illustrates, in a flow diagram, operations performed when a message is to be sent from a sender to one or more recipients in accordance with certain embodiments. FIG. 5 is formed by FIG. 5A and FIG. 5B.

Control begins in block 500 with the meaning mapper 410 receiving a message from a sender before message is sent to one or more recipients. In block 502, the meaning mapper 410 receives selection of a modality for each of the one or more recipients. In block 504, the meaning mapper 410 receives selection of a level of misunderstanding or misinterpretation for each of the one or more recipients. In block 506, the meaning mapper 410 receives a request for annotations for the message. In block 508, the meaning mapper 410 obtains one or more meaning maps 422a . . . 422n for the sender and the one or more recipients. In certain embodiments, one meaning map 422a . . . 422n is obtained for each of the recipients or for some group of the recipients (e.g., a sub-group or all of the recipients). In certain embodiments, a user may identify particular meaning maps 422a . . . 422n to use. In certain embodiments, the meaning mapper 410 obtains a meaning map 422*a* . . . 422*n* based on the recipients' identifying information (e.g., email address, name, etc.).

From block 508 (FIG. 5A), processing continues to block 510 (FIG. 5B). In block 510, for each recipient whose level exceeds the threshold, the meaning mapper 410 provides annotations on how each recipient may interpret the message based on the meaning maps for each recipient. In certain embodiments, the annotations are provided as a report.

In block 512, the meaning mapper 410, in response to providing the annotations, receives changes for one or more of the recipients. In block 514, the meaning mapper 410 determines whether additional annotations are to be provided. If so, processing loops back to block 510, otherwise, processing continues to block 516. In certain embodiments, the meaning mapper 410 automatically provides additional annotations based on the change message. In certain alternative embodiments, the meaning mapper 410 receives a request from the sender to provide additional annotations.

In block 516, the meaning mapper 410 sends message to the one or more recipients as changed by the sender for that recipient.

Figure 6:
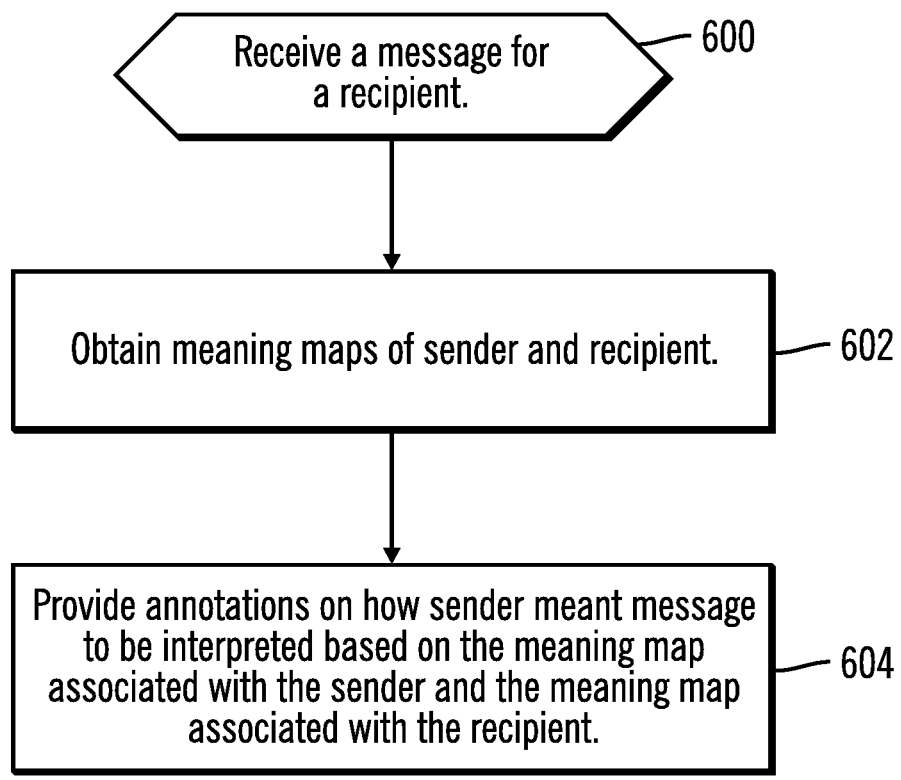
FIG. 6 illustrates, in a flow diagram, operations performed when a message is received by a recipient in accordance with certain embodiments.

FIG. 6 illustrates, in a flow diagram, operations performed when a message is received by a recipient in accordance with certain embodiments. Control begins in block 600 with the meaning mapper 410 receiving a message for a recipient. In block 602, the obtains meaning maps 422*a* . . . 422*n* of the sender and the recipient. In block 604, the meaning mapper 410 provides annotations on how the sender meant message to be interpreted based on the meaning map associated with the sender and the meaning map associated with the recipient.

The following is an example of annotations that may be provided by the meaning mapper 410. A sender initially writes the following message and requests annotations:
"further thoughts: apply approach to enterprise customer deployments . . . "

The meaning mapper 410 determines that the message may be interpreted differently by different recipients and provides the following annotations for each of three recipients:
Recipient A may interpret the message as: "further thoughts . . . could we think about applying the same approach for our enterprise customer deployments . . . "
Recipient B may interpret the message as: "further thoughts . . . we need to think about applying the same approach for our enterprise customer deployments . . . "
Recipient C may interpret the message as: "further thoughts . . . we are applying this approach for our enterprise customer deployments . . . "

The sender modifies the message as follows by selecting a "corrective action" proposed by the meaning mapper 410 to change the initial message to:
"further thoughts . . . we need to think about applying the same approach for our enterprise customer deployments . . . "

If the sender sent the message (with or without modification), the meaning mapper 410 may also provide annotations to each sender. For example, the meaning mapper 410 may have learned from past experience that the sender's way of asking really means "Do it", and the meaning mapper 410 provides annotations to modify the sentence by adding "we need to" to avoid any confusion on what is the meaning of what the sender is asking the team to do.

Figure 7:
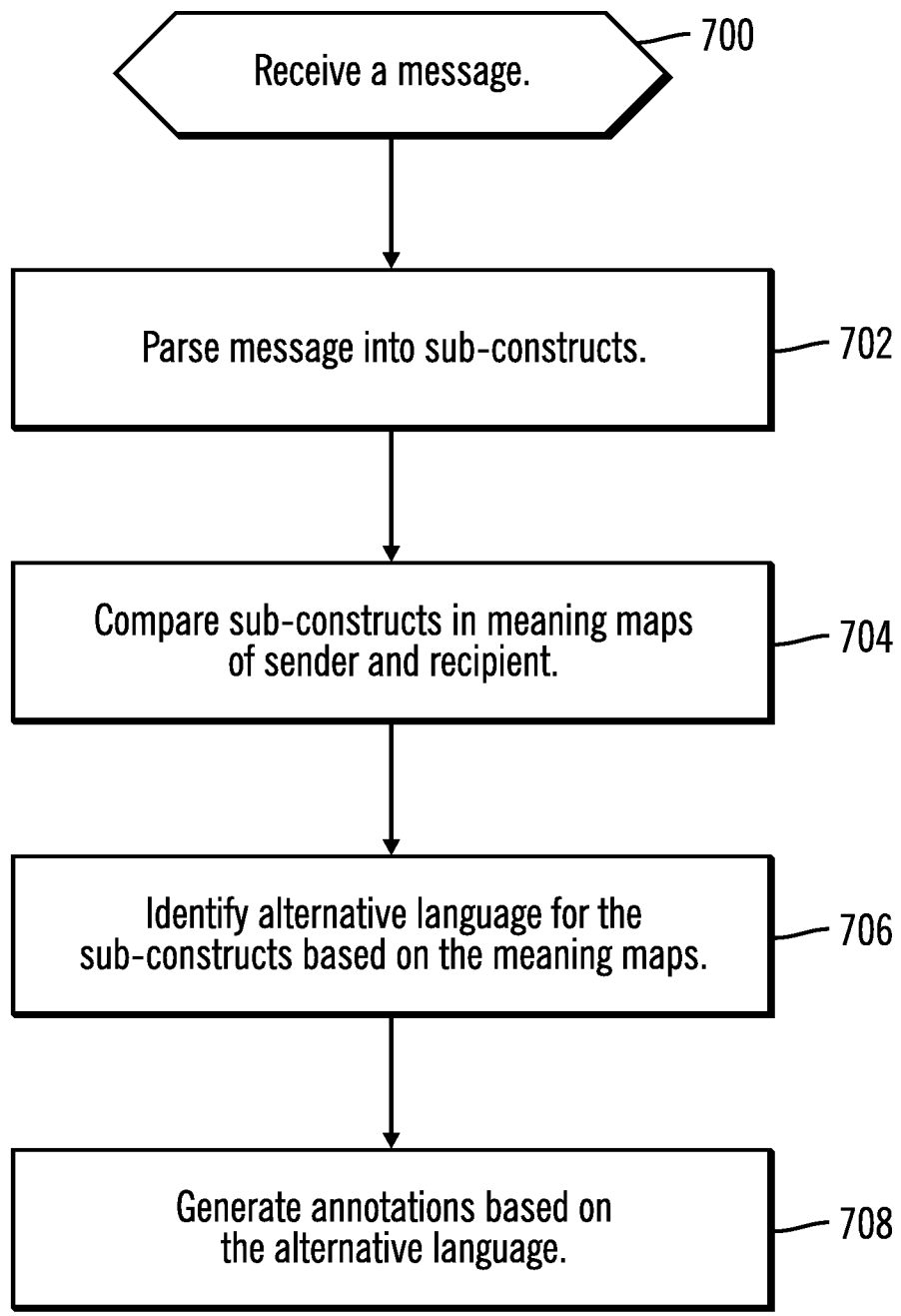
FIG. 7 illustrates, in a flow diagram, operations performed to provide annotations on a message in accordance with certain embodiments.

FIG. 7 illustrates, in a flow diagram, operations performed to provide annotations on a message in accordance with certain embodiments. Control begins in block 700 with the meaning mapper 410 receiving a message. In block 702, the meaning mapper 410 parses the message into sub-constructs. In block 704, the meaning mapper 410 compares sub-constructs in the meaning maps 422*a* . . . 422*n* of the sender and the recipient. In block 706, the meaning mapper 410 identifies alternative language (e.g., alternative tokens, words, phrases, etc.) for the sub-constructs based on the meaning maps 422*a* . . . 422*n*. In certain embodiments, the meaning mapper 410 identifies the alternative language using a personal dictionary 424*a* . . . 424*n* and/or a personal thesaurus 426*a* . . . 426*n* associated with the sender and/or recipient. For example, when a sender is about to send a message, the meaning mapper 410 may use a personal dictionary 424*a* . . . 424*n* and/or a personal thesaurus 426*a* . . . 426*n* associated with the recipient to identify alternative language. As another example, when a recipient receives a message, the meaning mapper 410 may use a personal dictionary 424*a* . . . 424*n* and/or a personal thesaurus 426*a* . . . 426*n* associated with the sender to identify alternative language that assists the recipient with understanding the message. In block 708, the meaning mapper 410 generates annotations based on the alternative language.

Thus, in certain embodiments, the meaning mapper 410 defines a meaning map 422*a* . . . 422*n* that describes how a person or group of persons uses and perceive language. The meaning map 422*a* . . . 422*n* consists of words and phrases combined with related facets of information about that person or group and use of and perception of those words or phrases.

In certain embodiments, the meaning mapper 410 analyzes words and phrases from one person or group (sender) to another person or group (recipient) by comparing meaning maps 422*a* . . . 422*n* and the various facets associated with words and phrases and identifying specific and interesting features based on the comparison. For example, the meaning mapper 410 may identify words and phrases where there are conflicts between the perceptions of the sender and the recipient and/or may identify words and phrases that have undesirable qualities to the recipient.

In certain embodiments, the meaning mapper 410 produces a report structure consisting of multiple feature comparison aspects. Such feature comparison aspects are associated with multiple recipients of a message.

In certain embodiments, the meaning mapper 410 displays the annotations to a user, such as via an instance messaging client, an e-mail, a social networking client or any correspondence that can be included in text.

The meaning mapper 410 has knowledge of who the recipient is, so prior to sending the message, the sender is provided with knowledge as to how the message will be interpreted by the particular recipient. This allows the sender to adjust the message so that the intention is corrected at the outset and prior to sending the message. Also, the meaning mapper 410 provides the recipient with knowledge of how the message should be interpreted.

The meaning mapper 410 take into account a user's usage, meaning, perception, and interpretation of the user's language. That is, the meaning mapper 410 recognizes that there may be multiple meanings to words, phrases or messages.

With embodiments, listening or reading refers to being open to what another user is saying and/or writing. The meaning mapper 410 sends out a message that should be accurately understood and returned.

In certain embodiments, social media (e.g., social software, websites, blogs, etc.) may be used for a user to find a subject matter expert to help with a problem. The seeker of expertise might be solving an urgent customer problem and does not have time to become personally acquainted with the expert. The meaning mapper 410 allows the seeker of expertise and the expert to communicate more effectively even if they have just met.

The meaning mapper 410 addresses several barriers to effective communication (e.g., cultural differences and imprecise used language).

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, solid state memory, magnetic tape or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational processing (e.g., operations or steps) to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The code implementing the described operations may further be implemented in hardware logic or circuitry (e.g., an integrated circuit chip, Programmable Gate Array (PGA), Application Specific Integrated Circuit (ASIC), etc. The hardware logic may be coupled to a processor to perform operations.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of the flow diagrams show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

The invention claimed is:

1. A method for providing annotations for revising a message, comprising:
receiving, using a processor of a first computing device, a message to be sent from a sender at the first computing device to a recipient at a second computing device, wherein the first computing device and the second computing device are coupled together via a communication network;
receiving selection of a dialect for the sender and a dialect for the recipient;
receiving a level of misunderstanding that is acceptable to the recipient;
selecting a meaning map associated with the sender based on the dialect for the sender to determine a first context of the message that indicates a first way in which the message is understood;
selecting a meaning map associated with the recipient based on the dialect for the recipient to determine a second context of the message that indicates a second way in which the message is understood;
parsing the message into sub-constructs;
comparing the sub-constructs in the meaning map associated with the sender and the meaning map associated with the recipient to identify words and phrases where there are differences between perceptions of the sender and the recipient; and
in response to the comparisons showing that the differences are greater than a threshold that is based on the level of misunderstanding that is acceptable,
identifying an alternative language for the sub-constructs in the message; and providing annotations for the message to the sender at the first computing device based on the alternative language before the message is sent from the sender at the first computing device to the recipient at the second computing device, wherein the annotations indicate the second context of the message; and sending the annotated message from the first computing device to the second computing device, wherein the message is received by the recipient at the second computing device, wherein the meaning map associated with the sender is obtained at the second computing device, and wherein annotations are provided to the recipient at the second computing device on how the sender meant the message to be interpreted based on the meaning map associated with the sender.

2. The method of claim 1, wherein software is provided as a service in a cloud environment.

3. The method of claim 1, further comprising:
associating a different level of misunderstanding that is acceptable with each of multiple recipients who are to receive the message.

4. The method of claim 1, further comprising:
receiving selection of a modality for each of multiple recipients who are to receive the message.

5. The method of claim 1, further comprising:
in response to providing the annotations, receiving changes to the message.

6. The method of claim 1, wherein there are multiple recipients and different annotations are provided for each of the multiple recipients.

7. The method of claim 1, wherein the alternative language is identified using at least one of a personal dictionary and a personal thesaurus.

8. A system for providing annotations for revising a message, comprising:
a first computing device;
a second computing device, wherein the first computing device and the second computing device are coupled together via a communication network;
a processor at the first computing device; and
a storage device connected to the processor, wherein the storage device has stored thereon a program, and wherein the processor is configured to execute instructions of the program to perform operations, wherein the operations comprise:
receiving a message to be sent from a sender at the first computing device to a recipient at the second computing device;
receiving selection of a dialect for the sender and a dialect for the recipient;
receiving a level of misunderstanding that is acceptable to the recipient;
selecting a meaning map associated with the sender based on the dialect for the sender to determine a first context of the message that indicates a first way in which the message is understood;
selecting a meaning map associated with the recipient based on the dialect for the recipient to determine a second context of the message that indicates a second way in which the message is understood;
parsing the message into sub-constructs;
comparing the sub-constructs in the meaning map associated with the sender and the meaning map associated with the recipient to identify words and phrases where there are differences between perceptions of the sender and the recipient; and in response to the comparisons showing that the differences are greater than a threshold that is based on the level of misunderstanding that is acceptable,
identifying an alternative language for the sub-constructs in the message; and
providing annotations for the message to the sender at the first computing device based on the alternative language before the message is sent from the sender at the first computing device to the recipient at the second computing device, wherein the annotations indicate the second context of the message; and
sending the annotated message from the first computing device to the second computing device, wherein the message is received by the recipient at the second computing device, wherein the meaning map associated with the sender is obtained at the second computing device, and wherein annotations are provided to the recipient at the second computing device on how the sender meant the message to be interpreted based on the meaning map associated with the sender.

9. The system of claim 8, wherein software is provided as a service in a cloud environment.

10. The system of claim 8, wherein the operations further comprise:
associating a different level of misunderstanding that is acceptable with each of multiple recipients who are to receive the message.

11. The system of claim 8, wherein the operations further comprise:
receiving selection of a modality for each of multiple recipients who are to receive the message.

12. The system of claim 8, wherein the operations further comprise:
in response to providing the annotations, receiving changes to the message.

13. The system of claim 8, wherein there are multiple recipients and different annotations are provided for each of the multiple recipients.

14. The system of claim 8, wherein the alternative language is identified using at least one of a personal dictionary and a personal thesaurus.

15. A computer program product for providing annotations for revising a message, the computer program product comprising:
a non-transitory computer readable storage medium having computer readable program code embodied therewith, wherein the computer readable program code, when executed by a processor of a first computing device, is configured to perform:
receiving a message to be sent from a sender at the first computing device to a recipient at a second computing device, wherein the first computing device and the second computing device are coupled together via a communication network;
receiving selection of a dialect for the sender and a dialect for the recipient;
receiving a level of misunderstanding that is acceptable to the recipient;
selecting a meaning map associated with the sender based on the dialect for the sender to determine a first context of the message that indicates a first way in which the message is understood;
selecting a meaning map associated with the recipient based on the dialect for the recipient to determine a second context of the message that indicates a second way in which the message is understood;

parsing the message into sub-constructs;

comparing the sub-constructs in the meaning map associated with the sender and the meaning map associated with the recipient to identify words and phrases where there are differences between perceptions of the sender and the recipient; and in response to the comparisons showing that the differences are greater than a threshold that is based on the level of misunderstanding that is acceptable, identifying an alternative language for the sub-constructs in the message; and providing annotations for the message to the sender at the first computing device based on the alternative language before the message is sent from the sender at the first computing device to the recipient at the second computing device, wherein the annotations indicate the second context of the message; and sending the annotated message from the first computing device to the second computing device, wherein the message is received by the recipient at the second computing device, wherein the meaning map associated with the sender is obtained at the second computing device, and wherein annotations are provided to the recipient at the second computing device on how the sender meant the message to be interpreted based on the meaning map associated with the sender.

16. The computer program product of claim 15, wherein software is provided as a service in a cloud environment.

17. The computer program product of claim 15, wherein the computer readable program code, when executed by the processor of the computer, is configured to perform:

associating a different level of misunderstanding that is acceptable with each of multiple recipients who are to receive the message.

18. The computer program product of claim 15, wherein the computer readable program code, when executed by the processor of the computer, is configured to perform:

receiving selection of a modality for each of multiple recipients who are to receive the message.

19. The computer program product of claim 15, wherein the computer readable program code, when executed by the processor of the computer, is configured to perform:

in response to providing the annotations, receiving changes to the message.

20. The computer program product of claim 15, wherein there are multiple recipients and different annotations are provided for each of the multiple recipients.

21. The computer program product of claim 15, wherein the alternative language is identified using at least one of a personal dictionary and a personal thesaurus.

* * * * *